United States Patent [19]

Devercelli

[11] Patent Number: 5,880,808
[45] Date of Patent: Mar. 9, 1999

[54] SPECTACLE MOUNT HAVING AN INTERMEDIATE BRIDGE

[76] Inventor: Pietro Devercelli, 15100 Alessandria, Via Poligonia, 90, Italy

[21] Appl. No.: 913,853
[22] PCT Filed: Mar. 29, 1996
[86] PCT No.: PCT/IT96/00061
 § 371 Date: Sep. 30, 1997
 § 102(e) Date: Sep. 30, 1997
[87] PCT Pub. No.: WO96/30798
 PCT Pub. Date: Oct. 3, 1996

[30] Foreign Application Priority Data

Mar. 31, 1995 [IT] Italy ................................. T095A0249

[51] Int. Cl.$^6$ ............................. G02C 5/02; G02C 5/12
[52] U.S. Cl. .......................... 351/132; 351/124; 351/136; 351/138
[58] Field of Search ..................... 351/124, 130, 351/131, 132, 133, 134, 136, 138, 65, 67, 68, 78, 110

[56] References Cited

U.S. PATENT DOCUMENTS 943,085  5/1909  Lawrence .
2,066,735  1/1937  Montgomery .
2,561,403  7/1951  Nelson ..................................... 351/132
5,046,199  9/1991  Hall ............................................ 2/446

FOREIGN PATENT DOCUMENTS 447.381  12/1912  France .
1.068.222  12/1952  France .
2 274 728  3/1994  United Kingdom .

*Primary Examiner*—Hung Xuan Dang
*Attorney, Agent, or Firm*—Shlesinger Arkwright & Garvey LLP

[57] ABSTRACT

A mount for spectacles with at least two lenses, wherein the lateral arms, the hinges, and the elements connecting the hinges to the lenses are preferably made of metal wire; the lenses are connected to each other by a supporting element, also preferably made of appropriately bent metal wire, fitted elastically to the lenses, and supporting between the ends a nose rest element made of flexible, anatomically adaptable material; the rest element is supported, preferably loosely, on the supporting element to define, with the supporting element, an intermediate bridge between the lenses, for supporting the mount at the front, and adaptable to any nasal structure.

11 Claims, 2 Drawing Sheets

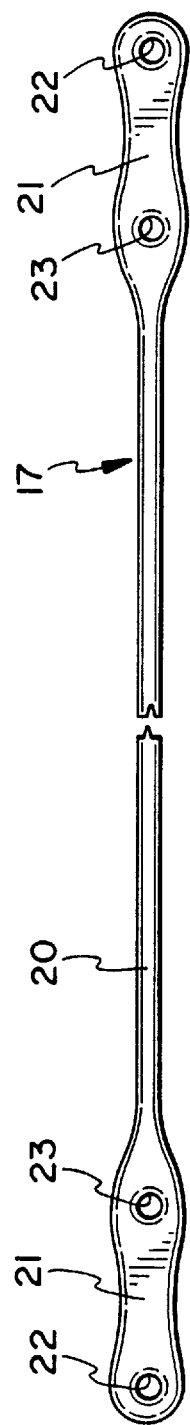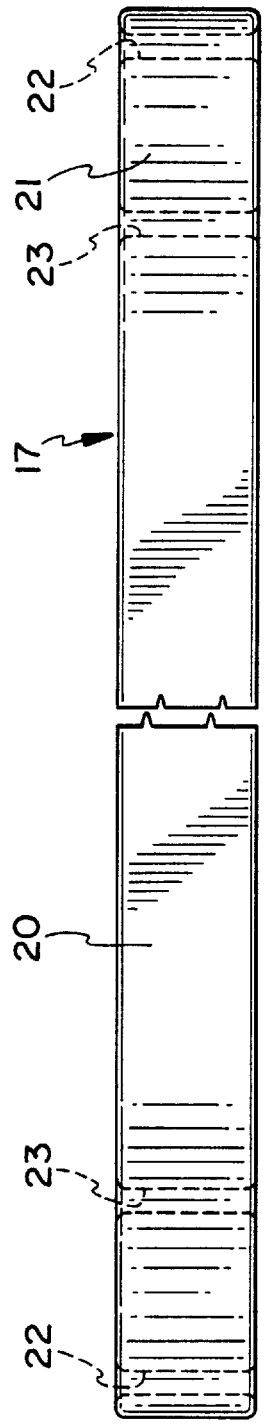

SPECTACLE MOUNT HAVING AN INTERMEDIATE BRIDGE

TECHNICAL FIELD

The present invention relates to a spectacle mount with a perfected intermediate bridge between two lenses, which may be made entirely of metal wire, which comprises two lateral arms pivoting on respective hinges connected to the lenses, and wherein the bridge is fitted elastically to the lenses by bends in the wire and is so formed as to support between the ends a nose rest element comprising a soft, flexible strip of material adaptable to any nasal structure.

More specifically, the present invention relates to a spectacle mount made entirely of wire material by simply bending and cutting the wire, with no other form of connection, e.g. welds, screws or rivets, between the wire portions.

BACKGROUND ART

Numerous spectacle designs are currently available, many of which feature frames made entirely of plastic material, or made partly of plastic and partly of metal elements, or made entirely of metal elements; and the lenses are normally supported on a frame fitted tightly about the edge of the entire lens and connected integral with the intermediate bridge.

In such designs, the bridge connecting the lenses presents two plates or nose rests, which rest laterally on either side of the nose to support the spectacles at the front. In some designs, the plates are fixed and formed in one piece with the frame, or are movable and fitted to the bridge by an articulated joint to enable them to adapt and rest comfortably on either side of the nose.

European Patent n. 256.098-B1 relates to a spectacle mount made of metal wire, and comprising two lateral arms pivoting on respective hinges, each of which is in turn connected to the respective lens by a portion of wire bent into a U-shaped bend in a plane, normally vertical, parallel to the fixed pin of the hinge, which bend is designed to be inserted elastically into a corresponding opening or slot formed close to the outer edge of the lens. The intermediate bridge connecting the two lenses, and which is also made of metal wire, is fitted to each lens by a wire portion bent into a U and inserted elastically into an opening formed close to the inner edge of the lens.

Two movable plates for support on either side of the nose are fitted in freely adjustable manner to respective eyelets integral with the connecting bridge and on which the plates are permitted to slide.

The above state-of-the-art mount nevertheless presents several drawbacks. Forming openings large enough to house the two wire portions forming the bend means removing a large amount of material and therefore involves more time and cost. Moreover, since the bend, once inserted inside the opening, works by expanding elastically, the lenses, which are normally made of highly rigid, fragile material of poor tensile strength and are already weakened by milling the openings, are subjected to dangerous tensile stress. To reduce the risk involved, the already large openings are therefore formed closer to the center of the lens, which, besides noticeably invading the field of view, creates discomfort to the wearer, especially in the case of thick lenses, by creating highly noticeable opaque or reflecting walls. Also to be taken into account is the accumulation of soil in the gap between the wires and the opening, which impairs the appearance of the spectacles.

Besides being unsightly, the plates eventually become a source of discomfort with prolonged use, and, by virtue of their shape, are easily soiled, thus further impairing their overall appearance.

DISCLOSURE OF INVENTION

It is a main object of the present invention to provide a spectacle mount with an intermediate bridge between the lenses designed to overcome the aforementioned drawbacks, and more specifically, to provide a spectacle mount made of metal wire and wherein the intermediate bridge is so formed as to support a nose rest element which provides for maximum comfort with prolonged use, presents superior service characteristics, adapts perfectly to any nasal structure, is highly flexible and deformable, is extremely hygienic even with prolonged use, is lightweight and small to reduce cost and weight, is of attractive appearance, and, more generally, is such as to enhance the comfort of the spectacles as a whole.

According to the present invention, there is provided a mount for spectacles, for supporting at least two lenses, and comprising two lateral arms pivoting on respective hinges connected to the lenses by fastening elements; and an intermediate bridge for connecting the lenses and supporting the mount at the front; characterized in that said intermediate bridge comprises a supporting element; and a nose rest element located at the supporting element, and which is anatomically adaptable, said rest element being made of flexible material, and being supported, preferably loosely, integral with the lenses and by connecting means.

BRIEF DESCRIPTION OF THE DRAWINGS

A preferred, non-limiting embodiment of the present invention will be described by way of example with reference to the accompanying drawings, in which:

FIG. 2 shows a top view of the nose rest on the FIG. 1 bridge;

FIG. 3 shows a side view of the FIG. 2 nose rest.

BEST MODE FOR CARRYING OUT THE INVENTION

Figure 1:
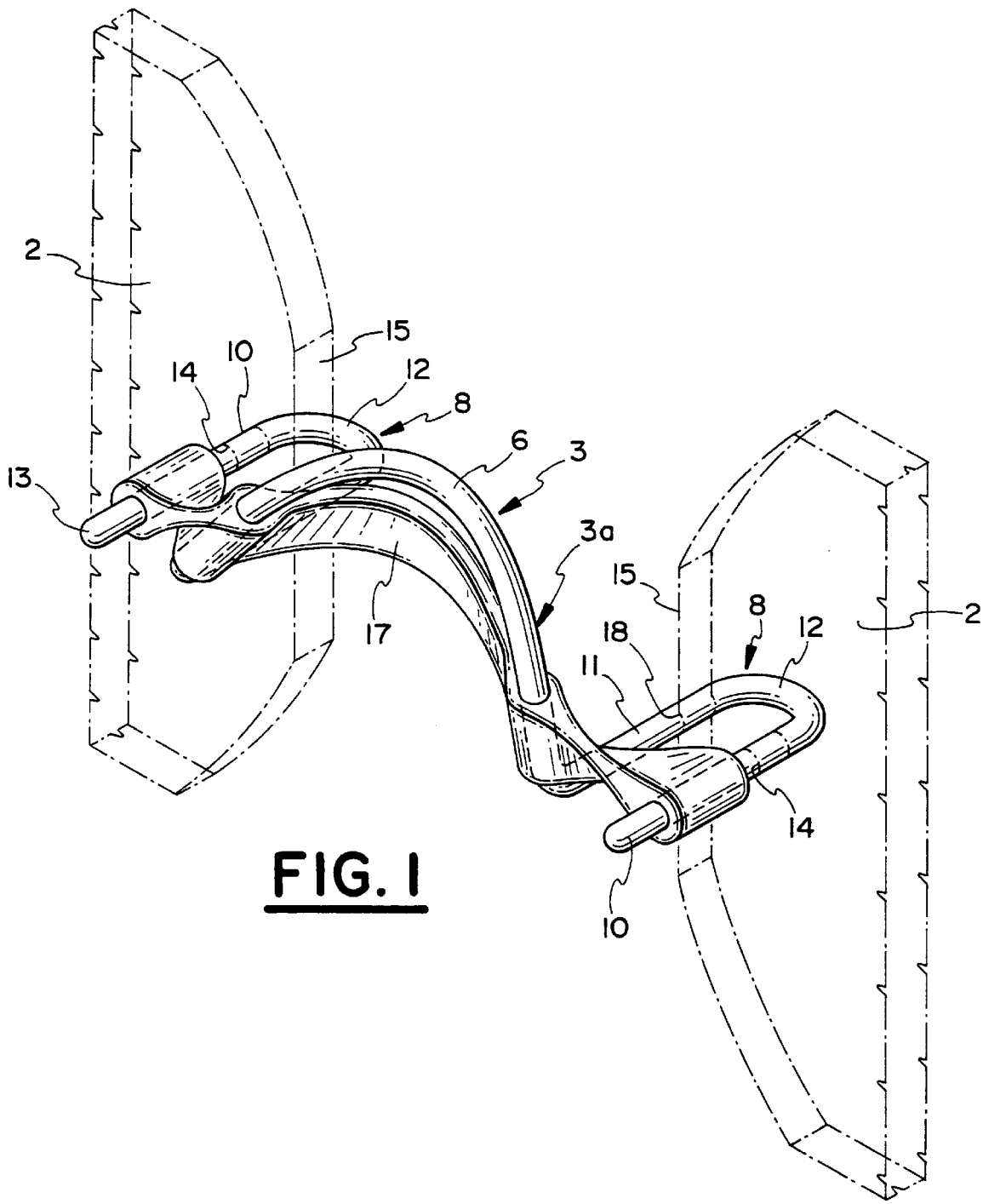
FIG. 1 shows an enlarged view in perspective of the perfected intermediate bridge according to the present invention.

The spectacles according to the invention and illustrated herein purely by way of example are preferably of the type featuring a discontinuous, so-called "GLASANT" mount, i.e. with no connection between the hinges and the intermediate bridge, in that the lenses themselves act as a supporting and connecting element.

A spectacle design of the above type is described in detail in a patent application filed concurrently by the present Applicant, and which is incorporated herein by way of reference as required. Said spectacles comprise a mount supporting two lenses, and in turn comprising two lateral arms pivoting on respective hinges, each connected to a respective lens by means of a portion of wire bent into a U and fitted elastically to the lens; and an intermediate bridge between the lenses, and also made of wire, presents end portions of wire bent so as to elastically grip the lenses.

The bridge, as well as the other parts of the mount, is made of wire of superior mechanical characteristics, such as a high degree of resilience, but of sufficient elasticity to permit a small amount of elastic deformation necessary for fitment of the lenses to the bridge. The metal wire must also present superior aesthetic characteristics, must be resistant to oxidation by air and humidity, must be resistant to staining in contact with exudation substances, such as perspiration when handled, and must not cause allergies.

The most advantageous wire for such applications is metal wire comprising a titanium alloy, but, for aesthetic purposes, the titanium wire may be plated with noble metal, such as gold, silver or platinum and/or alloys thereof, or the wire may be made entirely of such noble metals or even innovative materials, such as composite materials, carbon fiber, etc.

With reference to FIGS. 1 to 3, in accordance with the main object of the present invention, there are provided spectacles featuring two lenses 2 (or a number of pairs of superimposed lenses) connected to each other by an intermediate bridge 3; bridge 3 presents a supporting element 3a connecting the lenses and, in the example shown, made of the same (or different) type of metal wire as for the rest of the mount; supporting element 3a comprises a central portion 6 which, in the non-limiting example shown, is in the form of an upwardly-convex, forward-inclined arc (FIG. 1); central portion 6 is connected to lenses 2 by a pair of identical, symmetrical elastic anchoring elements 8 at each end, each anchoring element comprising a portion of wire bent into a U, and each portion presenting two straight, parallel wire portions or arms 10 and 11; arms 10 and 11 are connected to each other by a curved portion of wire 12 in the same plane as arms 10 and 11; each arm 10 presents a free end 13; and each arm 11, at the opposite end to that connected to curve 12, is connected to portion 6, either directly or with the formation of intermediate rest elements resting directly or indirectly on the nose of the user.

In actual use, the free end 13 of each arm 10 is inserted through a respective hole 14 formed through the thickness of the respective lens, close to the edge 15 of the lens. When assembled, the free end 13 of arm 10 projects sufficiently from the rear of the lens to support one end of a rest element 17 which, according to the invention, forms part of bridge 3 and replaces the conventional nose rests. Rest element 17 is located at supporting element 3a, is made of flexible, anatomically adaptable material, and is supported at each end, preferably loosely, on supporting element 3a by means of respective connecting elements for connecting supporting element 3a and defined by ends 13.

According to the non-limiting example shown, which represents a straightforward embodiment of the present invention, rest element 17 comprises a strip of soft material designed to rest across the nose and form a front supporting point for the spectacles. The other arm 11 of each anchoring element 8 is forced lightly and elastically against edge 15 of the respective lens.

According to a variation of the mount according to the invention, a groove 18 is formed, parallel to the axis of hole 14, on the outside of edge 15 of each lens, and arm 11 is inserted inside groove 18 to ensure a firm grip of the lens by anchoring element 8. When so assembled, the lenses are firmly anchored to bridge 3, and any relative rotation of the lenses is prevented by the elastic compression exerted by arms 10, 11 between hole 14 and edge 15.

The above solution affords numerous advantages as compared with known mounts currently available. Forming only one relatively small-diameter hole results in practically no weakening of the lens, unlike the formation of an opening for the passage of two spaced wires; in view of the very low tensile strength of the materials from which the lenses are made, gripping the lens by compression between arms 10 and 11 is decidedly safer than subjecting it to tensile stress; and assembling arms 10 and 11 horizontally as opposed to vertically provides for reducing visual interference, in that the human eye is less sensitive to horizontal than vertical lateral images.

Rest element 17 is made, for example, of synthetic elastomeric material affording superior service characteristics, e.g. adaptability to different nasal structures, to ensure maximum comfort with prolonged use; maximum flexibility and elasticity for troublefree shaping, e.g. to simplify assembly to bridge 3; lightness and small size for low cost and an attractive appearance.

To achieve and best meet the above characteristics and requirements, rest element 17 is made in the form of a strip of silicon rubber, comprising a central portion 20 of constant thickness, and two thicker end portions 21 identical to each other and symmetrical in relation to central portion 20. Each end portion 21 presents a pair of parallel through holes 22 slightly smaller in diameter than the wire, so that a certain amount of force is required to fit the end portions on to the wire; the width of strip 17 is preferably constant along its entire length, but central portion 20 may, alternatively, present a different width as compared with end portions 21; the center distance of the holes in each pair is roughly equal to (or less than) the center distance of arms 10 and 11; and the length of strip 17, measured between the inner holes 23 of the two pairs 22, is (or may be made elastically) somewhat greater than the distance between inner arms 11 of anchoring elements 8, so that, when strip 17 is fitted to supporting element 3a, central portion 20 remains slack to adapt easily to the nasal structure of the user, and also to permit permanent deformation (plastical adjusting) of bridge 3 to adjust the distance between the connections of strip 17 and the lenses to the particular requirements of the user.

With reference to FIG. 1, bridge 3 is assembled as follows:

arms 10 are inserted through respective inner holes 23 of respective pairs of holes 22, and the two end portions 21 are slid along respective curved portions 12 and along respective arms 11 to engage, on either side, respective first portions of central portion 6 of bridge 3;

the two lenses are fitted on to respective arms 10 up to respective curved portions 12;

arms 10 are inserted through the respective outer holes of respective pairs of holes 22, and the two end portions 21 are pushed up against the respective lenses.

The part of each end portion 21 fitted to arm 10 locks the inner hole 23 in the assembly position on supporting element 3a by virtue of the force fit of the end portion on the wire. In certain embodiments of the mount according to the invention, the free end 13 of each arm 10 may be threaded to receive a nut for securing the lens, and which, for aesthetic reasons, may be made of noble metal and/or conveniently ornamented; or outer holes 22 may be dead holes and terminate with a cap formed in one piece with the rest of element 17 and which covers end 13.

Clearly, changes may be made to the spectacle mount as described and illustrated herein without, however, departing from the scope of the present invention.

I claim:

1. A spectacle mount for supporting two lenses comprising:

a) two lateral arms adapted to pivot on respective hinges connected to the lenses by fastening elements;

b) an intermediate bridge for connecting the lenses and supporting the spectacle mount at a front end thereof;

c) said intermediate bridge including a supporting element constructed from bent wire and connected to the lenses;

d) an anatomically adaptable nose rest element operatively associated with said supporting element;

e) connecting members operatively associated with said nose rest element, said connecting members are for being secured to the lenses; and, f) said nose rest element comprising a strip constructed from flexible and soft material, said strip including fastening members for fitment to a respective one of said connecting members and supported thereby.

2. A spectacle as claimed in claim 1, and wherein said connecting members are integral with said supporting element.

3. A spectacle as claimed in claim 1 and wherein said strip of flexible and soft material comprises a central portion of uniform thickness, and two thicker lateral portions integral with said fastening members.

4. A spectacle as claimed in claim 3, and wherein said intermediate bridge comprises a central supporting portion made of wire; and said connecting members comprise a pair of anchoring elements located at respective ends of said central supporting portion and connectable to a respective one of said lenses; each anchoring element presenting a first wire portion insertable through a hole in the lens, and a second wire portion which is pressed externally against the edge of the lens to elastically grip the lens by compression.

5. A spectacle as claimed in claim 4, and wherein said fastening members comprise holes formed in said thicker lateral portions for receiving said first and second wire portions.

6. A spectacle as claimed in claim 5, and wherein the length of said strip measured between the respective one of said holes, is equal to or greater than the distance between said second wire portions of said anchoring elements whereby when said strip is assembled to the intermediate bridge said central portion remains slack to adapt easily to any anatomical conformation of a user's nose.

7. A spectacle as claimed in claim 5, and wherein the length of said strip measured between the respective one of said holes, is extensible elastically whereby when said strip is assembled to said intermediate bridge, said central portion remains slack and readily adapts to any anatomical conformation of a user's nose.

8. A spectacle as claimed in claim 4 and wherein said edge includes an outer groove disposed parallel to said hole for receiving said second wire portion.

9. A spectacle as claimed in claim 4 characterized in that said first and second wire portions are substantially parallel to each other and joined by an intermediate wire portion, each of said first and second wire portions and said intermediate wire portion lie in the same plane.

10. A spectacle as claimed in claim 4 and wherein said first wire portions are sized so as to project rearwardly from the lenses a length sufficient to support said nose rest element of said intermediate bridge.

11. A spectacle as claimed in claim 1 and wherein said flexible material is selected from the group consisting of elastomers, leather, PVC, Nylon, and silicon rubber.

* * * * *

UNITED STATES PATENT AND TRADEMARK OFFICE
CERTIFICATE OF CORRECTION

PATENT NO. : 5,880,808
DATED : March 9, 1999
INVENTOR(S) : Pietro DEVERCELLI

It is certified that error appears in the above-indentified patent and that said Letters Patent is hereby corrected as shown below:

On the title page, item [86]: The filing dates for §371 and §102(e) should read --September 29, 1997--.

Signed and Sealed this

Seventeenth Day of August, 1999

Attest:

Q. TODD DICKINSON

*Attesting Officer*     *Acting Commissioner of Patents and Trademarks*